(12) United States Patent
Lipinski

(10) Patent No.: US 6,873,694 B2
(45) Date of Patent: Mar. 29, 2005

(54) TELEPHONY NETWORK OPTIMIZATION METHOD AND SYSTEM

(75) Inventor: Greg J. Lipinski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 535 days.

(21) Appl. No.: 09/999,407

(22) Filed: Oct. 30, 2001

(65) Prior Publication Data

US 2003/0081748 A1 May 1, 2003

(51) Int. Cl.[7] .............................................. H04M 3/42
(52) U.S. Cl. ........................ 379/201.02; 379/265.09
(58) Field of Search ...................... 379/201.02, 265.02, 379/265.09, 265.11, 265.12, 265.13, 900; 370/352, 356; 709/226, 228, 229

(56) References Cited

U.S. PATENT DOCUMENTS

| 5,787,163 | A | * | 7/1998 | Taylor et al. ........... 379/266.08 |
| 6,134,530 | A | * | 10/2000 | Bunting et al. ................. 705/7 |
| 6,744,877 | B1 | * | 6/2004 | Edwards ................. 379/265.02 |
| 6,744,878 | B1 | * | 6/2004 | Komissarchik et al. 379/265.03 |
| 6,754,714 | B1 | * | 6/2004 | Chebrolu ..................... 709/229 |

* cited by examiner

*Primary Examiner*—Bing Q. Bui

(57) ABSTRACT

A telephony network optimization system and method comprises receiving a request from an application to provide to the application service on a telephony network. The method also comprises automatically allocating to the application a channel on the telephony network to provide balanced network service in response to telephony parameters.

22 Claims, 2 Drawing Sheets

TELEPHONY NETWORK OPTIMIZATION METHOD AND SYSTEM

TECHNICAL FIELD OF THE INVENTION

The present invention relates in general to telecommunications and, more particularly, to a telephony network optimization method and system.

BACKGROUND OF THE INVENTION

Many changes in inter-personal and inter-organizational communication have been enabled by developments in a variety of protocols and multimedia communications technology. For example, multimedia communication allows text, voice and video to be used alone or in combination for communication with a wide audience.

Unfortunately, conventional systems and methods for processing requests by applications for telephony network service typically suffer from disadvantages. For example, these systems usually consider personal computer (PC) network requests by any application on the PC as having the same properties. Such systems may allow requests to be processed, but each time these short access requests are processed, the user typically must wait for a connection to be established, and disconnection occurs either immediately after the request is completed, or does not occur until the Internet Service Provider (ISP) forces a disconnection. These connection and disconnection times monopolize system resources and time that could otherwise be available for telephony use. This disadvantage is compounded where the user submits multiple short access requests, such as various requests for URLs or web pages, when surfing the Internet. Moreover, in some cases, a single short access request may result in a dial-up connection being monopolized for an unnecessarily long duration. Therefore, the connection is monopolized so that the user cannot use it for other purposes.

SUMMARY OF THE INVENTION

One illustrative embodiment of the present invention is a telephony network optimization method. The method comprises receiving a request from an application to provide to the application service on a telephony network. The method also comprises automatically allocating the application a channel on the telephony network to provide balanced network service in response to telephony parameters.

Another illustrative embodiment of the present invention is a telephony network optimization application. The application comprises application software resident on a computer-readable medium. The application software is operable to receive a request from an appliance application to provide to the appliance application service on a telephony network. The application software is also operable to automatically allocate the appliance application a channel on the telephony network to provide balanced network service in response to telephony parameters.

A further illustrative embodiment is a telephony network optimization system. The system comprises an appliance operable to connect to one of a plurality of networks that includes a telephony network and a network manager resident on the appliance. The network manager is operable to receive a request from an application resident on the appliance to provide to the application service on the telephony network. The network manager is also operable to automatically allocate the application a channel on the telephony network to provide balanced network service in response to telephony parameters.

BRIEF DESCRIPTION OF THE DRAWINGS

For a more complete understanding of the present invention and the advantages thereof, reference is now made to the following descriptions taken in connection with the accompanying drawings and which.

DETAILED DESCRIPTION OF THE DRAWINGS

From the foregoing, it may be appreciated that a need has arisen for providing a method for processing requests by applications for telephony network service using a set of parameters. In accordance with the present invention, a telephony network optimization system and method are provided that substantially eliminate or reduce disadvantages and problems of conventional systems.

Figure 1:
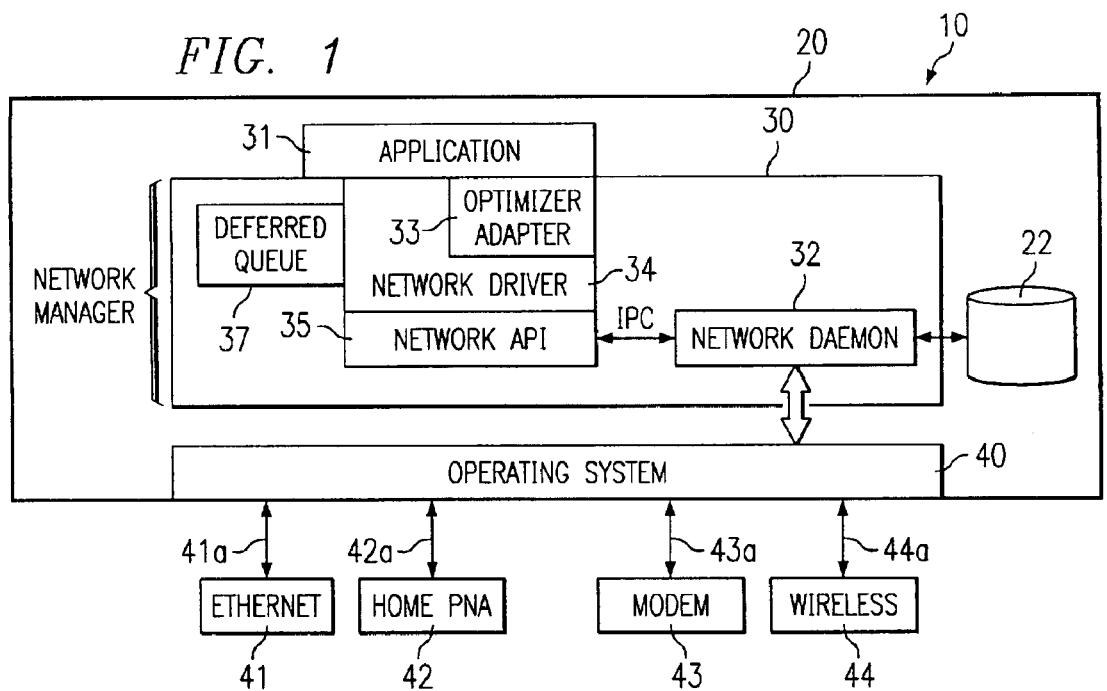
FIG. 1 is a block diagram of an embodiment of a telephony optimization system utilizing teachings of the present invention.

FIG. 1 is a block diagram of an embodiment of a telephony network optimization system utilizing teachings of the present invention. System 10 includes an appliance 20 that may be used to provide network service requested by one or more applications, a process which is managed by a network manager 30. The present invention may provide a system and method for determining how to allocate channels within a telephony network to applications in accordance with telephony parameters. A channel is a portion of bandwidth in a network that may be allocated to a request. The number of available channels that may be allocated depend on a variety of parameters including, but not limited to, the type of network and type and number of requests interested in the channel. For example, a broadband connection and a dial-up modem may support widely varying bandwidths. The method accepts requests for telephony network service that may be allocated based on telephony parameters such as, but not limited to, dial-up prompting, request persistence, application time out, connection hold time, and request priority.

The availability of at least one of these parameters allows the present invention to optimize the usage of the telephony network by controlling multiple applications. For example, in a particular embodiment, a priority parameter determines whether a request is immediate, in which case the request is immediately allocated a channel and a connection established if needed; or deferrable, in which case the request is processed with a next immediate request. Other examples of telephony parameters include a dial-up prompting parameter, which allows a requesting application, or requester, to give a user of an appliance control over an Internet connection. A network manager 30 may accept or reject an application's request for network access as discussed in more detail below. A request persistence parameter may be used to define whether a request may initiate a connection if one has not already been established, and whether multiple attempts are to be made if a connection attempt fails. An application timeout parameter may be used to define how long a requesting application can maintain an Internet connection before a disconnect is forced. A long application timeout period may be used, for example, in an audio streaming application such as Iradio, where the user of appliance 20 is listening to streamed music from one or more sources, and expects to continue to send or receive data over the network for an extended period of time. A connection hold time parameter may be used to define how long a connection should be maintained after the last request has been released. This description utilizes the term "balanced network service" to describe an achieved balance between device usage and telephone usage using the telephony network optimization methods described herein. Embodiments of the present invention use telephony parameters to reduce the time an appliance coupled to a telephony network is online; for example, the present invention contemplates deferring non-essential access requests to be processed with the next essential or immediate request by utilizing a priority parameter. A dial-up prompt parameter may allow a user to decide whether to allow network connections on each request; that is, the user may decide when it is appropriate to connect to the telephony network using an appliance, and when to keep the telephone available for phone conversations. Additionally, a timeout parameter may be used to specify a maximum connect time after which an application may be forced to disconnect from the telephony network, reducing monopolization of the telephony network where a user might connect to the network and forget to disconnect.

Appliance 20 is coupled to a telephony network 43 via a respective communication link, 43a. Network 43 may be the public switched telephone network (PSTN) that is accessible through a dial-up connection, e.g., with a modem. In a particular embodiment, appliance 20 may also be coupled to a plurality of additional networks 41, 42, and 44 via respective communication links 41a, 42a, and 44a. By example and not by limitation, network 41 may be an Ethernet network, connected via a broadband mechanism such as a digital subscriber line (DSL) or cable modem. Network 42 may be a network that conforms with the Home Phoneline Network Alliance (HomePNA) standard, which provides use of a plurality of applications using existing wiring in a physical location such as a home residence, and network 44 may be a wireless network. Wireless network 44 may use a protocol such as the wireless application protocol (WAP) to communicate with wireless devices such as, but not limited to, mobile phones and personal digital assistants (PDAs).

Appliance 20 may comprise a network manager 30, one or more applications 31, and an operating system (OS) 40. Appliance 20 may also include input/output (I/O) device 22. Appliance 20 may be a network appliance such as a digital entertainment center operable to process a plurality of media types, including music. Appliance 20 may also be a general or a specific purpose computer, and may be a portion of a computer adapted to execute an operating system. Appliance 20 may be a wireless device, such as a phone, personal digital assistant, or Internet appliance. Appliance 20 may access and/or include applications or software routines within network manager 30, depending on a particular application. Many methods for implementing a software architecture may be used and include, but are not limited to, object-oriented designs. I/O device 22 or other memory such as a cache or random access memory (RAM) may be suitable for storing all or a portion of these programs or routines and/or temporarily storing data during various processes performed by appliance 20. Memory and/or I/O device 22 may be used, among other things, to support real-time analysis and/or for storing and/or processing of data. In a particular embodiment, system 10 may further comprise one or more queues, such as a deferred queue 37.

These queues may reside on appliance 20, a portion of I/O device 22, or a combination of both. In a particular embodiment, network manager 30 includes deferred queue 37. Deferred queue 37 may be used to store requests with a deferred priority until the next immediate request is processed, in accordance with the invention.

Figure 3:
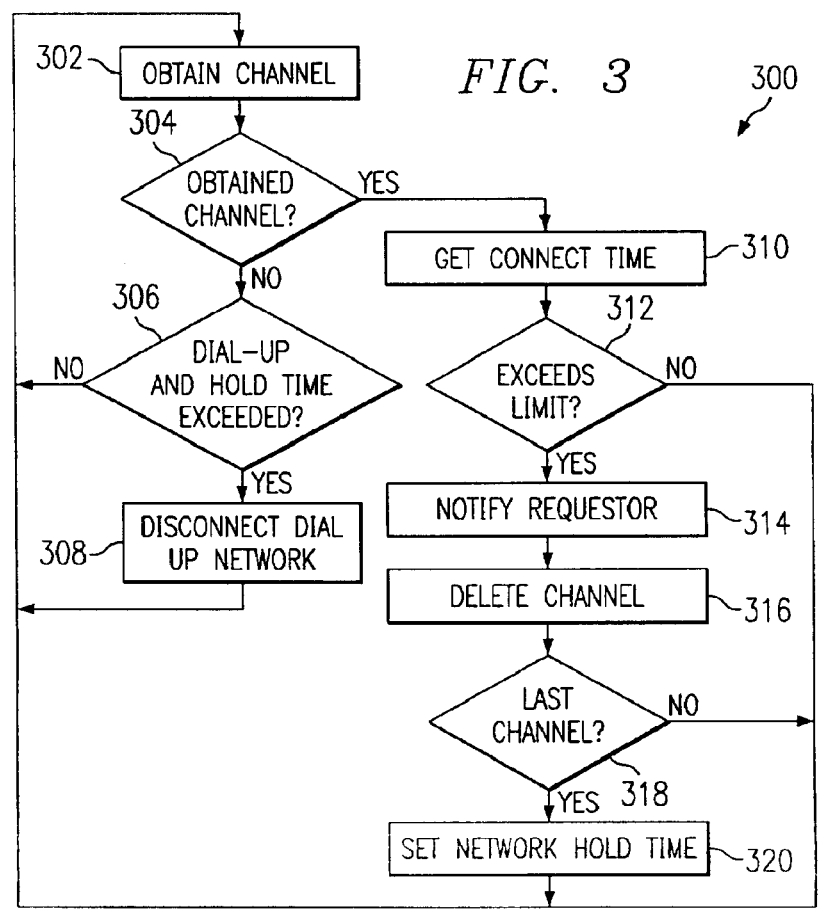
FIG. 3 is an example of a method that may be used by a network daemon utilizing teachings of the present invention.
Figure 2:
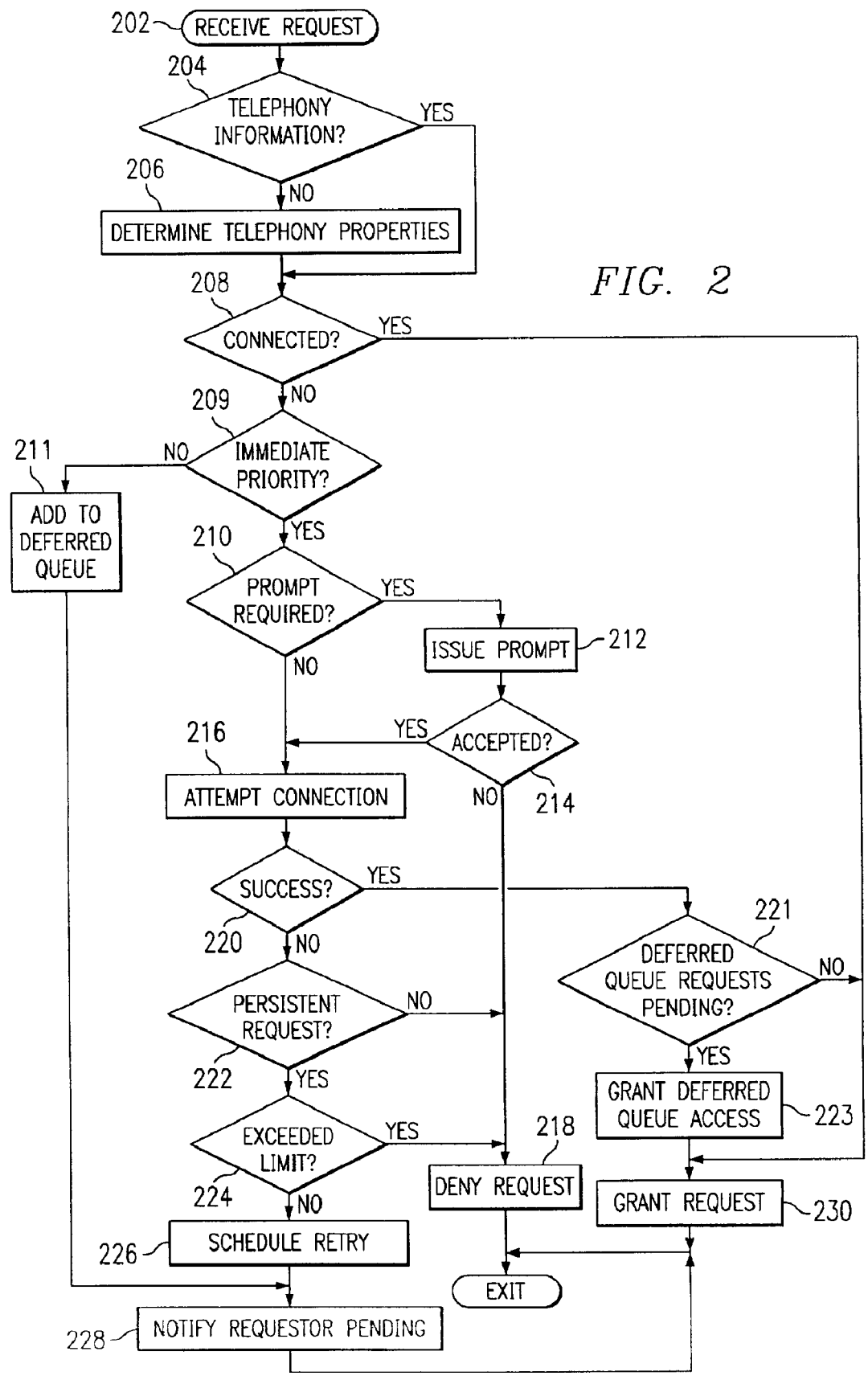
FIG. 2 is an example of a method that may be used in a telephony optimization system utilizing teachings of the present invention.

Network manager 30 is operable to receive requests for network service from application 31 and to grant these requests using a method consistent with that discussed in further detail in conjunction with FIGS. 2–3. Network manager 30 will, in a particular embodiment, grant or deny a request for network service by application 31. In a particular embodiment, network manager 30 may comprise an optimizer adapter 33, network driver 34, a network application programming interface (API) layer 35, and a network daemon 32. Network driver 34 forms an interface between multiple applications 31 and network manager 30. In a particular embodiment, network driver 34 may utilize an optimizer adapter 33 to generate dialup optimization parameters based on the requesting application context, when none are provided by an application 31. These parameters may be generated by a number of techniques that include, but are not limited to, table-lookup mechanisms, algorithmic generators and heuristic adaptation. API layer 35 forms an interface between network driver 34 and network daemon 32 enabling them to communicate through various inter-process communications (IPC) methods, such as shared memory, message queues, and pipes. Network manager 30 provides control mechanisms to initiate and grant network access to OS 40 to networks 41–44. Once granted, a requesting application 31, or requestor, may use one of many known techniques to directly access data through OS 40 from networks 41–44 through network interfaces (not explicitly shown).

Network daemon 32 configures and controls any mechanisms in OS 40 necessary to control data transfer to networks 41, 42, 43, and 44. Network daemon 32 may provide configuration and control functions by obtaining parameters such as a channel identifier, desired network, and a requestor identifier from application 31. Network daemon 32 may utilize parameters such as persistence, time limits, and disconnect information to perform the functions of granting an application access and disconnecting that application when it is complete.

I/O device 22 may be any suitable storage media. Configuration files, contextual information, and other data may be stored in a variety of formats in I/O device 22. For example, contextual information may be stored in a table, flat file, or any database, including object-oriented, relational, and other databases now known or developed in the future. Contextual information may be used to tailor network service more closely to a particular application or action that might be expected by a user, and many varieties of contextual information may be used according to the teachings of the invention. Contextual information may be associated with an application, a user, a platform, a network, a connection, or all of the above. By way of example and not by limitation, contextual information for an application 31, such as an audio player requesting information over the Internet from a compact disc database (CDDB) manager, may be used to determine parameters such as a connection hold time, persistence, priority, prompting and/or application timeout. As examples of these parameters, without limitation, connection hold time may be defined as how long to maintain the Internet connection after the CDDB information has been received and the request has been released. In such a scenario, example parameters that may be derived from contextual information may include a two minute connection hold time, priority to obtain an immediate connection, persistence to attempt to connect up to five times (should prior connection attempts fail), no interactive prompt to the user, and an application timeout of seven minutes, which allows the user to browse for additional time. The application timeout may be based on expected behavior of a particular user, or aggregate users, who make these kinds of requests. For example, users may typically want more information than a single request from a CDDB manager, and spend additional time browsing online before they want to move on to another task. As another example, a user tuned into Iradio may want a longer connection as the user streams music data to one or more rooms in a residence using appliance 20. In this scenario, the application timeout may be for a period of time such as an hour, so that the channel will automatically be disconnected so that the telephony network is not monopolized indefinitely should the user, for example, forget to disconnect the application from the telephony network. In such a case, a connection hold time may be one minute, for a user to change stations until he finds music to suit his taste, an action that the user typically does not perform that often.

Although FIG. 1 illustrates a single appliance 20, the use of multiple appliances 20 is also contemplated, so that network bandwidth optimization may be performed by any number of computers. Each additional appliance 20 may also be similarly or identically structured to include some or all of the elements of appliance 20, e.g., the optimization of the usage of a telephony line coupled to multiple appliances 20.

FIG. 2 illustrates an example of a method that may be used in a telephony optimization system utilizing teachings of the present invention. The method generally includes the steps of receiving a request for network service from an application 31, and connecting application 31 to requested network 43, depending on various parameters. In a particular embodiment, these parameters may be supplied or associated with the requesting application, or may be determined by other methods, including heuristic methods as desired. It should be appreciated that a part of a process may be described as "returning" or exiting", i.e., the method preferably returns control to requesting application 31.

The method begins in step 202, where a request for network service is received from an application 31. In step 204, the method queries whether telephony parameters are present. If so, the method proceeds to step 208. If not, in step 206, telephony parameters are determined. In a particular embodiment, these parameters include a prompt parameter, application timeout, connection persistence and connection hold time. Moreover, the request may include a priority, in which case the method may provide immediate access to a channel. In a particular embodiment, these properties may be determined by optimizer adapter 33, using a variety of methods. One method for determining these properties may comprise the use of heuristic adaptation or other algorithms that may utilize, or derive, the parameters from contextual or other information such as statistical information that may be useful in assessing expected behavior of either a user or an application. By way of example and not by limitation, contextual information may be used to determine or estimate a user's tendencies for submitting certain types or patterns of requests. As another example, contextual information may be utilized to determine expected durations of such requests. In some applications, it may be desirable to empirically determine, or otherwise provide predetermined values for; contextual information for determining one or more telephony parameters. This information may be stored using a variety of methods such as, but not limited to, one or more tables or in a database.

The method then proceeds to step 208. In step 208, the method queries whether the dial-up communication link is not in a connected state. If it is connected, the method proceeds to step 230 where the request is granted and the method exits. If it is not connected, the method proceeds to step 209, where the method checks the priority parameter. If the priority is immediate, then the method proceeds to step 210. In a particular embodiment, if the priority is deferred, then the method proceeds to step 211, where the request is added to deferred queue 37. The method then proceeds to step 228, to notify the requestor that the request is pending. The method then exits. While there are a number of acceptable data structures for queue 37, a first-in, first-out (FIFO) queue is preferred.

In step 210, the method determines whether a prompt is required. If a prompt is required, the method issues a dial-up prompt to the user in step 212. If the prompt is accepted in step 214, the method requests a connection in step 216. If the prompt is not accepted, the method denies the request in step 218 and the method then exits. If a prompt is not required in step 210, the method proceeds to step 216 where the connection is attempted. If the connection attempt is determined to be successful in step 220, the method proceeds to step 221 where deferred queue 37 is checked for pending requests. If there are deferred requests pending then the method proceeds to step 223 where each deferred request is granted network access and in step 230, where the request is granted. If there are no deferred requests pending in step 221 the method proceeds to step 230 where the request is granted. The method then exits.

If the connection attempt fails in step 220, the method proceeds to step 222, where the method queries whether the request is persistent. A persistent request may be used when an application requires the method to automatically retry to connect when there may be a connection or other failure with allocation of a channel in response to its request. As one example, the method may automatically retry a persistent request a predetermined number of retry attempts, separated by a predetermined time period. Other methods may be used, including numbers of retry attempts and/or time periods that are dynamically determined, such as in response to contextual information. If the request is not persistent, the method denies the request in step 218. If the request is persistent, the method queries in step 224 whether the retry limit is exceeded. If so, the method denies the request in step 218. If the retry limit is not exceeded in step 224, the method schedules a retry in step 226, and then notifies the requestor that its request is pending, in step 228. The method then exits.

FIG. 3 is an example of a method that may be used by a network manager utilizing teachings of the present invention. For dial-up connections and in a particular embodiment, network manager 30 may perform a method to check application timeouts, and disconnect the dial-up network. For example, in step 302, network manager 30 may access an allocated channel. Many methods may be used by network manager 30 including, but not limited to, reading a channel identifier from a list. The method queries whether network manager 30 obtained a channel in step 304. If no channels are found, then the method queries whether the dial-up network is still connected and the connection hold time is exceeded in step 306. If not, the method returns to step 302 for network manager 30 to obtain another channel. If the dial-up network is still connected and the connection hold time is exceeded in step 306, the method proceeds to step 308, where network manager 30 disconnects the dial-up network. The method then returns to step 302 for network manager 30 to obtain another channel.

If network manager 30 obtained a channel in step 304, network manager 30 then determines the duration of the connect time for the channel in step 310. For example, network manager 30 may maintain this information, among other data, on an ongoing basis for each channel. The method checks whether the connect time obtained in step 310 exceeds the connect time limit for the channel in step 312. The connect time limit is specified by the application timeout parameter. If the connect time does not exceed the connect time limit, the method returns to step 302 for network manager 30 to obtain another channel. If the connect time obtained in step 310 exceeds the limit in step 312, network manager 30 proceeds to step 314 where it notifies the requesting application that it must release its channel. Network manager 30 then in step 316 cleans up data structures being used in system 10 by, for example, deleting the channel.

The method queries in step 318 whether the channel that was just deleted is the last channel. If not, the method returns to step 302 for network manager 30 to obtain the next channel. If the deleted channel is the last channel, the method proceeds to step 320 to set the network hold time to that of the deleted channel. Thus, when all of the requests have been released, the connection to the network may be maintained for the period of time requested for the channel. The method returns to step 302 for network manager 30 to obtain another channel.

The invention contemplates numerous embodiments of the methods discussed in conjunction with FIGS. 2 and 3. For example, in a particular embodiment, network manager 30 may utilize a software architecture that includes one or more applications, and that may be logically composed of several classes and interfaces. These classes may operate in a distributed environment and communicate with each other using distributed communications methods, and may include a distributed component architecture. Various embodiments of the invention may utilize fewer or more steps, and these methods may be performed using a number of different implementations and different orders of workflow, depending on the application. Some of the steps may be performed in parallel. For example, various steps may be processed at the same time for different requests from one or more applications 31, depending on the application. Moreover, queuing and prioritization of requests may be performed according to a number of various algorithms other than using a FIFO queue or deferring a deferrable request to the next immediate request. Other embodiments may process deferrable requests after other immediate requests have been processed. The invention also contemplates the use of various methods for many of the steps discussed. For example, a number of methods may be used to determine available bandwidth in step 218, and add a request to a queue in step 226.

Some embodiments of the invention enable an appliance such as an Internet appliance to simultaneously run multiple applications by coordinating network service for each application. This provides, for example, an efficient and effective dial-up networking experience to a user, without unduly long connection and re-connection times, and without unnecessarily monopolizing the dial-up connection. The user may then use the dial-up line for telephone conversations. Such embodiments may reduce or eliminate the problems encountered with conventional methods and systems that allocate network access to requests without regard to dial-up connection and/or reconnection time. At least one embodiment balances device usage of a telephony network with telephone usage, e.g., reducing user waiting time and/or increasing any ease of using an appliance coupled to a telephony network while increasing the availability of a telephone for phone conversations using the telephony network. In addition, some embodiments may increase the ease of use by a user of an appliance; for example, a persistence parameter may specify a number of retries and/or time intervals to use to automatically retry to connect when a connection to the telephony network is busy. Moreover, some embodiments of the invention may reduce inconvenience to a user of the telephony network, e.g., a hold time parameter may be used to maintain a connection to the telephony network for a period of time after a request has been released. As one example, instead of disconnecting immediately after a request has been serviced, a connection to the telephony network may be held for a short period of time for a user to service additional short requests over the telephony network such as, for example, searching for an artist's biography after performing a compact disc database (CDDB) search.

What is claimed is:

1. A telephony network optimization method, comprising:
   receiving a request from an application to provide to the application service on a telephony network; and
   determining whether to allocate to the application a channel on the telephony network based on telephony parameters for obtaining balanced network service between the application usage of the telephony network and telephone usage of the telephony network.

2. The method of claim 1, further comprising deriving the telephony parameters in response to contextual information.

3. The method of claim 2, further comprising deriving the contextual information using heuristic adaptation.

4. The method of claim 1, further comprising deriving the telephony parameters for the application if the application does not include the telephony parameters.

5. The method of claim 1, wherein the telephony parameters are selected from the group consisting of a priority, connection hold time, request persistence, dial-up prompt and application timeout.

6. The method of claim 1, further comprising deferring the request to a next immediate request if the telephony parameters indicate a deferred priority.

7. A telephony network optimization application, comprising:
   application software resident on a computer-readable medium and operable to
   receive a request from an appliance application to provide to the appliance application service on a telephony network; and
   determine whether to allocate to the appliance application a channel on the telephony network based on telephony parameters for obtaining balanced network service between the appliance application usage of the telephony network and telephone usage of the telephony network.

8. The application of claim 7, wherein the appliance application and the computer-readable medium are each operatively associated with an appliance coupled to the telephony network.

9. The application of claim 7, further comprising the application software further operable to derive the telephony parameters in response to contextual information.

10. The application of claim 9, further comprising the application software further operable to derive the contextual information using heuristic adaptation.

11. The application of claim 7, further comprising the application software further operable to derive the telephony parameters for the appliance application if the appliance application does not include the telephony parameters.

12. The application of claim 7, wherein the telephony parameters are selected from the group consisting of a priority, connection hold time, request persistence, dial-up prompt and application timeout.

13. The application of claim 7, further comprising the application software further operable to defer the request to a next immediate request if the telephony parameters indicate a deferred priority.

14. A system for telephony network optimization, comprising:
   an appliance operable to connect to a telephony network; and
   a network manager resident on the appliance and operable to
   receive a request from an application resident on the appliance to provide to the application service on the telephony network, and
   determine whether to allocate to the application a channel on the telephony network based on telephony parameters for obtaining balanced network service between the appliance usage of the telephony network and telephone usage of the telephony network.

15. The system of claim 14, further comprising the network manager further operable to derive the telephony parameters in response to contextual information.

16. The system of claim 15, further comprising the network manager further operable to derive the contextual information using heuristic adaptation.

17. The system of claim 14, further comprising the network manager further operable to derive the telephony parameters for the application if the application does not include the telephony parameters.

18. The system of claim 14, further comprising the network manager further operable to defer the request to a next immediate request if the telephony parameters indicate a deferred priority.

19. The system of claim 18, wherein the next immediate request is received from a second application operatively associated with the appliance.

20. The system of claim 14, wherein the telephony parameters comprise at least one of the group consisting of a priority, connection hold time, request persistence, dial-up prompt and application timeout.

21. A telephony network optimization method, comprising:
   receiving a request from an application to provide to the application service on a telephony network; and
   determining whether a telephony parameter associated with the request requires acceptance of a user prompt to provide to the application access to the telephony network.

22. A telephony network optimization application, comprising:
   application software resident on a computer-readable medium and operable to:
   receive a request from an appliance application to provide to the appliance application service on a telephony network; and
   determine whether a telephony parameter associated with the request requires acceptance of a user prompt to provide to the application access to the telephony network.

* * * * *

(12) EX PARTE REEXAMINATION CERTIFICATE (10092nd)

United States Patent
Lipinski

(10) Number: US 6,873,694 C1
(45) Certificate Issued: Apr. 2, 2014

(54) TELEPHONY NETWORK OPTIMIZATION METHOD AND SYSTEM

(75) Inventor: Greg J. Lipinski, Loveland, CO (US)

(73) Assignee: Comcast IP Holdings I, LLC, Wilmington, DE (US)

Reexamination Request:
No. 90/012,863, May 10, 2013

Reexamination Certificate for:
Patent No.: 6,873,694
Issued: Mar. 29, 2005
Appl. No.: 09/999,407
Filed: Oct. 30, 2001

(51) Int. Cl.
*H04L 12/28* (2006.01)

(52) U.S. Cl.
USPC ............................. 379/201.02; 379/265.09

(58) Field of Classification Search
None
See application file for complete search history.

(56) References Cited

To view the complete listing of prior art documents cited during the proceeding for Reexamination Control Number 90/012,863, please refer to the USPTO's public Patent Application Information Retrieval (PAIR) system under the Display References tab.

*Primary Examiner* — Ovidio Escalante

(57) ABSTRACT

A telephony network optimization system and method comprises receiving a request from an application to provide to the application service on a telephony network. The method also comprises automatically allocating to the application a channel on the telephony network to provide balanced network service in response to telephony parameters.

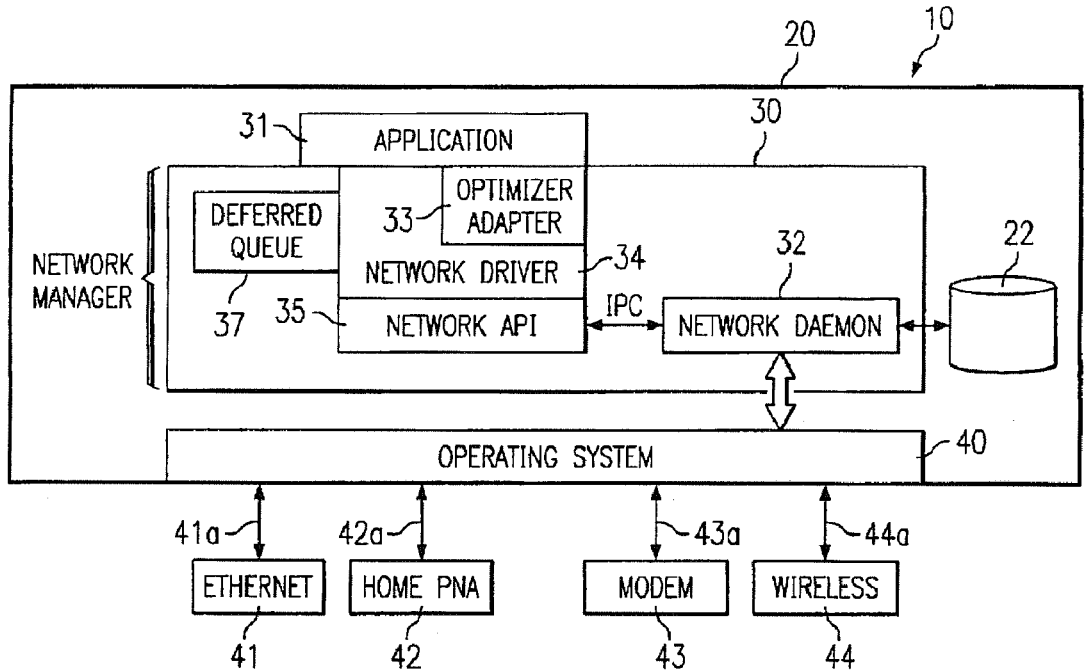

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 5 and 21 is confirmed.

New claims 23-30 are added and determined to be patentable.

Claims 2-4, 6-20 and 22 were not reexamined.

*23. The method of claim 1, further comprising determining if the telephony parameters are present in the received request.*

*24. The method of claim 1, further comprising determining whether a deferred request from the application to provide to the application service on the telephony network is pending.*

*25. The method of claim 1, further comprising sending notification of a deferred request from the application to provide to the application service on the telephony network.*

*26. The method of claim 5, wherein the telephony parameters include the connection hold-time and the dial-up prompt.*

*27. The method of claim 5, wherein the telephony parameters include the application timeout and the dial-up prompt.*

*28. The method of claim 21, wherein the request includes at least two telephony parameters.*

*29. The method of claim 28, wherein the at least two telephony parameters are selected from the group consisting of a priority, connection hold-time, request persistence, dial-up prompt and application timeout.*

*30. The method of claim 21, wherein the telephony parameter is a telephony parameter for obtaining balanced network service between the application usage of the telephony network and telephone usage of the telephony network.*

\* \* \* \* \*